United States Patent
Je

(10) Patent No.: US 12,500,542 B2
(45) Date of Patent: Dec. 16, 2025

(54) ELECTRONIC CONTROL UNIT AND DRIVING METHOD THEREOF

(71) Applicant: HL MANDO CORPORATION, Gyeonggi-do (KR)

(72) Inventor: Kyuyeong Je, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 186 days.

(21) Appl. No.: 18/122,708

(22) Filed: Mar. 17, 2023

(65) Prior Publication Data

US 2023/0299703 A1    Sep. 21, 2023

(30) Foreign Application Priority Data

Mar. 17, 2022   (KR) .................... 10-2022-0033158

(51) Int. Cl.
  *H02P 27/08*    (2006.01)
  *B62D 5/04*     (2006.01)
  *H02M 1/00*     (2007.01)
  *H02M 7/5387*   (2007.01)

(52) U.S. Cl.
  CPC .......... *H02P 27/08* (2013.01); *H02M 1/0009* (2021.05); *H02M 7/53871* (2013.01); *B62D 5/0481* (2013.01)

(58) Field of Classification Search
  CPC . H02P 27/08; H02M 1/0009; H02M 7/53871; B62D 5/0481

USPC ......................................................... 318/504
See application file for complete search history.

(56) References Cited

U.S. PATENT DOCUMENTS

| 2016/0325777 A1* | 11/2016 | Mori ...................... H02P 6/085 |
| 2020/0153375 A1* | 5/2020 | Mori ................. H02M 7/53871 |
| 2021/0270911 A1* | 9/2021 | Kageyama .......... H02M 1/0009 |

FOREIGN PATENT DOCUMENTS

| JP | 2002-136178 | 5/2002 |
| JP | 2014-131393 | 7/2014 |
| KR | 10-2019-0030501 | 3/2019 |

OTHER PUBLICATIONS

Office Action dated Jun. 13, 2025 for Korean Patent Application No. 10-2022-0033158 and its English translation provided by Applicant's foreign counsel.

* cited by examiner

*Primary Examiner* — Kawing Chan
(74) *Attorney, Agent, or Firm* — WOMBLE BOND DICKINSON (US) LLP

(57) ABSTRACT

A vehicle steering assistance device and a driving method thereof are capable of simplifying the configuration of a circuit, reducing manufacturing cost, and reducing the possibility of circuit failure. The vehicle steering assistance device may include: a motor; and a switch unit that connects or disconnects all phase terminals corresponding to a neutral point of the motor based on an external control signal.

16 Claims, 9 Drawing Sheets

ELECTRONIC CONTROL UNIT AND DRIVING METHOD THEREOF

CROSS-REFERENCE TO RELATED APPLICATION

This application claims priority to and the benefit of Korean Patent Application No, 10-2022-0033158, filed on Mar. 17, 2022, in the Korean Intellectual Property Office (KIPO), the disclosure of which is incorporated by reference herein in its entirety.

TECHNICAL FIELD

The present disclosure relates to an electronic control device, and more particularly, to an electronic control device capable of accurately detecting an offset voltage of a current sensor and a method for driving the same.

BACKGROUND

A conventional electric power steering system generates a steering assist force by determining a driver's steering intention and a driving situation of a vehicle using generated torque, vehicle speed, steering angle, etc., and comprehensively considering them, and makes it easier for a driver to drive the vehicle, which allows the vehicle to operate more safely.

The electric power steering system includes many mechanical and electronic parts, but the most important component is an electronic control device. The electronic control device is a core device of the electric power steering system which analyzes electrical signals transmitted from various external sensors to determine the driver's steering intention and the driving situation of the vehicle, and controls a motor using various logics provided.

PRIOR ART DOCUMENT (Patent Document) Korean Patent Application Publication No. 10-2019-0030501 (published on Mar. 22, 2019)

SUMMARY

An object of the present disclosure is to provide an electronic control device capable of accurately detecting an offset voltage of a current sensor and a method for driving the same.

An electronic control device according to the resent disclosure includes: an inverter 260 connected between a power supply unit 100 and a motor 300; a current sensor CS1, CS2 connected between the inverter and the motor; and a control unit 220 that detects an offset voltage of the current sensor CS1, CS2, wherein when detecting the offset voltage of the current sensor CS1, CS2, the control unit 220 controls operation of the inverter 260 so that the current sensor CS1, CS2 is connected to one of the power supply unit and a ground GND.

The inverter includes: a first switch IT1, IT2, IT3 connected between an output terminal of the inverter and the power supply unit 100; and a second switch IT4, IT5, IT6 connected between the output terminal of the inverter and the ground.

When detecting the offset voltage of the current sensor, the control unit turns on one of the first switch and the second switch and turns off the other one.

During a detection period Pd in which the control unit detects the offset voltage of the current sensor, the control unit supplies a first switch control signal PWM1, PWM2, PWM3 to the first switch, and supplies a second switch control signal PWM4, PWM5, PWM6 having a different level from the first switch control signal to the second switch.

During the detection period, the first switch control signal is fixed to one of a turn-on level VH and a turn-off level VL, and during the detection period, the second switch control signal is fixed to the other one of the turn-on level and the turn-off level.

The current sensor includes: a resistor Rs1 connected between an output terminal of the inverter and the motor 300; and an amplifier AP1 coupled to the resistor.

The control unit detects the offset voltage using the current sensor in a state in which the current sensor is connected to one of the power supply unit 100 and the ground.

The control unit stores the detected offset voltage.

When the motor 300 is driven, the control unit controls the operation of the inverter based on the stored offset voltage.

A driving method of an electronic control device 200 including a current sensor connected between an inverter and a motor 300, according to the present disclosure, includes: controlling operation of the inverter so that the current sensor is connected to one of a power supply unit 100 and a ground; and detecting an offset voltage of the current sensor using the current sensor in a state in which the current sensor is connected to one of the power supply unit 100 and the ground.

The inverter includes: a first switch connected between an output terminal of the inverter and the power supply unit 100; and a second switch connected between the output terminal of the inverter and the ground The detecting of the offset voltage of the current sensor includes turning on one of the first switch and the second switch and turning off the other one.

During a detection period in which the detecting of the offset voltage of the current sensor is performed, a first switch control signal is supplied to the first switch, and a second switch control signal having a different level from the first switch control signal is supplied to the second switch.

During the detection period, the first switch control signal is fixed to one of a turn-on level and a turn-off level, and during the detection period, the second switch control signal is fixed to the other one of the turn-on level and the turn-off level.

The detecting of the offset voltage of the current sensor includes detecting the offset voltage using the current sensor in a state in which the current sensor is connected to one of the power supply unit and the ground.

The driving method further includes storing the detected offset voltage.

The driving method further includes controlling the operation of the inverter based on the stored offset voltage when the motor is normally driven.

The electronic control device and the driving method thereof according to the present disclosure can provide the following effects.

First, since the high-side inverter switches or the low-side inverter switches are all turned off during the detection period, no motor driving current is substantially generated during the detection period. Therefore, interference by the motor driving current does not occur during the detection period.

Second, during the detection period, the current sensor is connected to the ground or the power supply unit without floating. Thus, the voltage of the terminal of the current sensor can be precisely defined.

Third, the PWM signals supplied to the inverter switches during the detection period can be fixed to a constant level (e.g., turn-on level or turn-off level), so that switching noise is not generated.

As described above, since interference by the motor driving current does not occur, the terminal voltage of the current sensor is accurately defined, and no switching noise is generated, the offset voltage of the current sensor can be accurately detected during the detection period.

DETAILED DESCRIPTION

Figure 1:
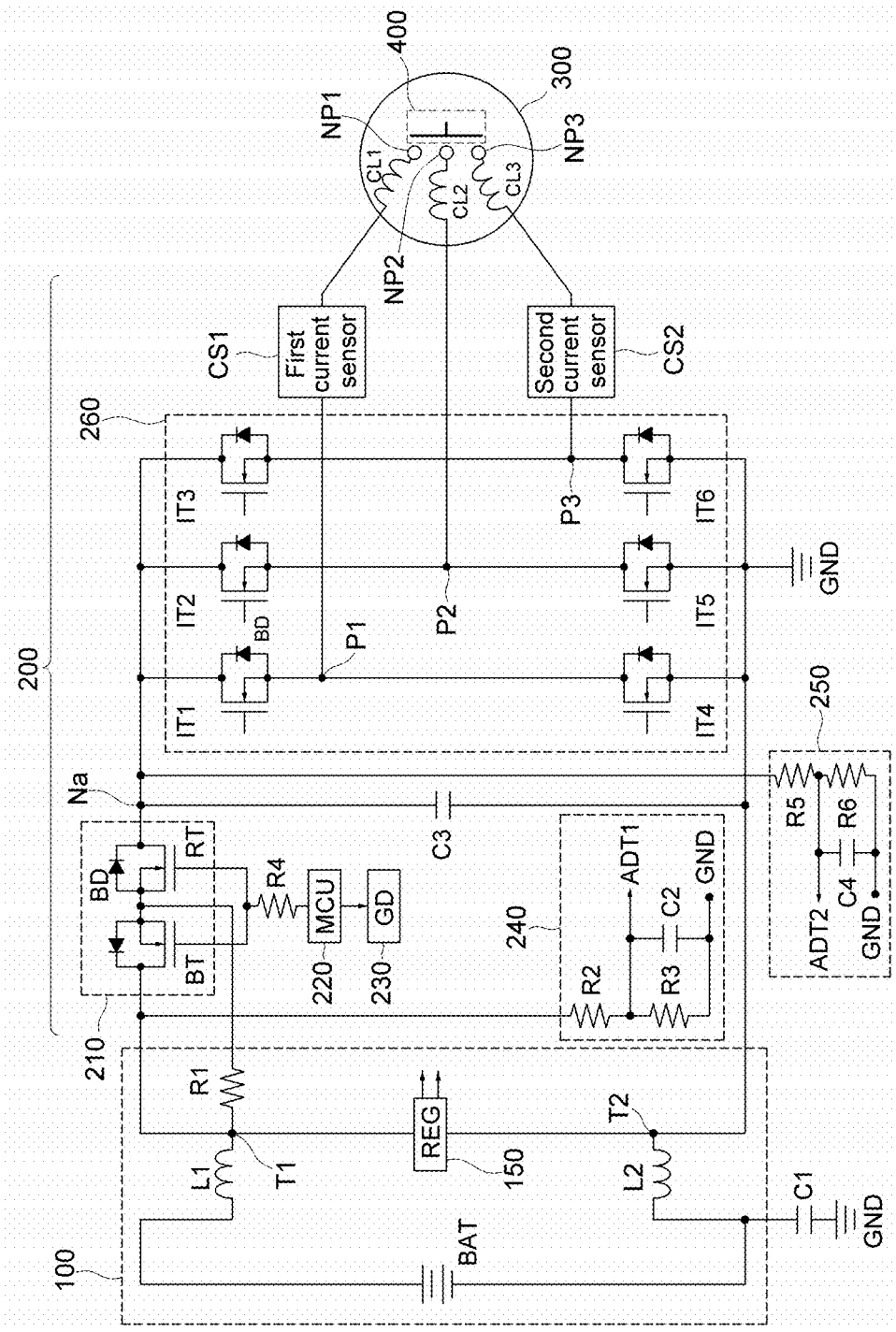
FIG. 1 is a circuit configuration diagram of an electronic control device according to one embodiment of the present disclosure.

Advantages and features of the present disclosure, and methods for achieving them, will become apparent with reference to the following embodiments in conjunction with the accompanying drawings. However, the present disclosure is not limited to the embodiments disclosed below and may be implemented in various different forms. The embodiments are provided only to complete the present disclosure and to allow those skilled in the art to which the present disclosure pertains to fully understand the scope of the present disclosure, and the present disclosure is defined only by the scope of the claims. Thus, in some embodiments, well-known process steps, well-known element structures, and well-known techniques have not been described in detail in order to avoid obscuring the interpretation of the present disclosure. Like reference numerals designate like components throughout the present specification.

In the drawings, in order to clearly express various layers and regions, the thicknesses thereof are shown enlarged. A same reference numeral has been assigned to similar parts throughout the specification.

In the present specification, terms such as first, second, and third may be used to describe various components, but these components are not limited by the terms. The terms are used to distinguish a specific component from other components. For example, without departing from the scope of the present disclosure, a first component could be termed a second or third component, and similarly, the second or third component could also be termed interchangeably.

Unless otherwise defined, all terms (including technical and scientific terms) used in the present specification may be used in a meaning that is commonly understood by those skilled in the art to which the present disclosure pertains. In addition, terms defined in commonly used dictionaries are not interpreted ideally or excessively unless explicitly specifically defined.

Hereinafter, an electronic control device and a driving method thereof according to one embodiment of the present disclosure will be described in detail with reference to FIGS. 1 to 9.

Figure 2:
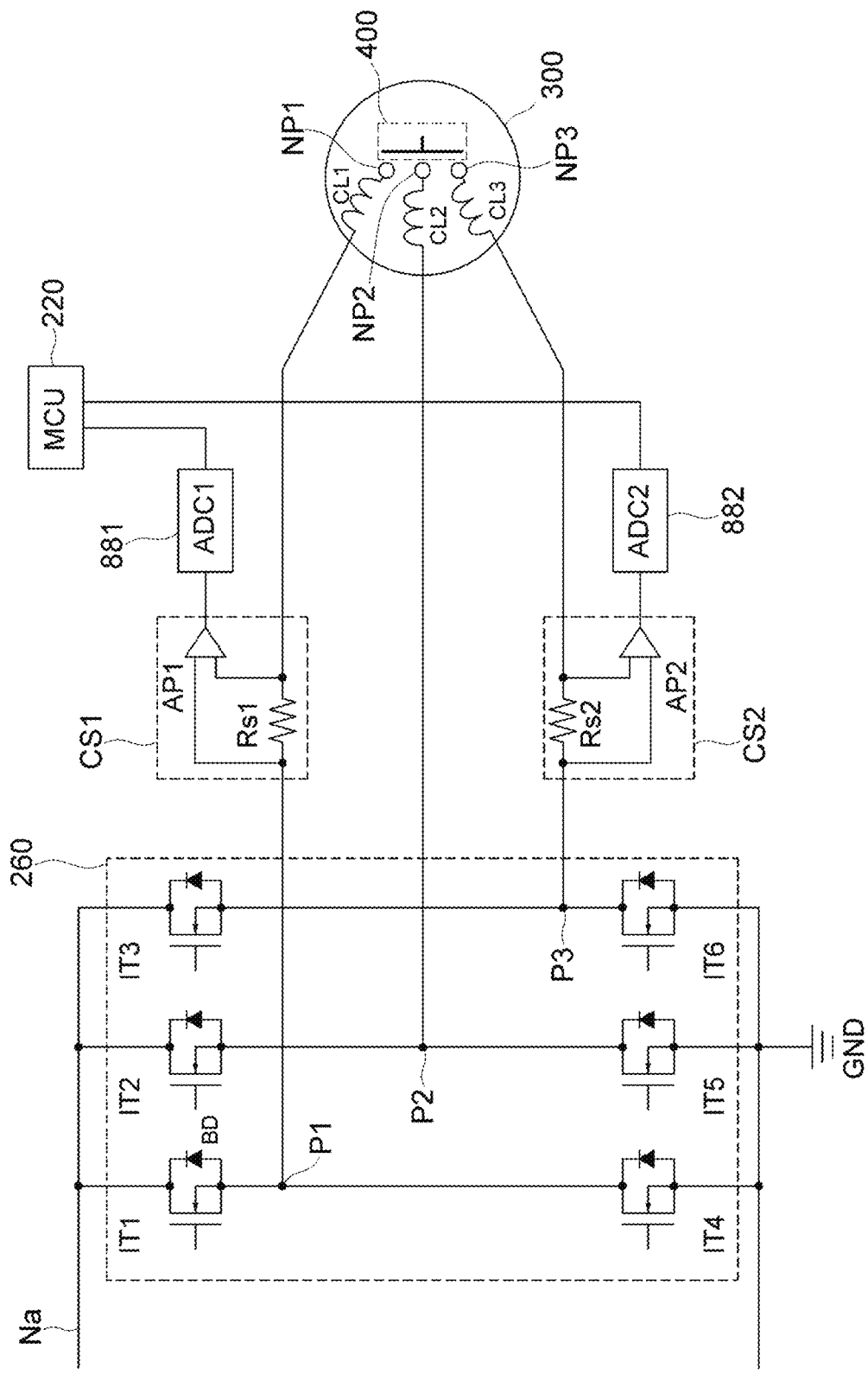
FIG. 2 is a diagram for explaining a current sensor of FIG. 1.

FIG. 1 is a circuit configuration diagram of an electronic control device 200 according to one embodiment of the present disclosure, and FIG. 2 is a diagram for explaining a current sensor of FIG. 1.

An electronic control device (ECU) 200 according to one embodiment of the present disclosure may be connected to a power supply unit, power supplier or power supply 100 and a motor 300, as in one example shown in FIG. 1. Meanwhile, the electronic control device 200 may be, for example, an electronic control unit for a vehicle steering assistance device. Such an electronic control device 200 according to one embodiment of the present disclosure, as in one example shown in FIG. 1, may include a supply power control unit or controller 210, a battery detection unit 240, an inverter detection unit 250, a microcontroller 220, a gate driver 230, a third capacitor C3, an inverter 260, a first current sensor CS1, a second current sensor CS2, motor 300, and an output control unit or controller 400.

The power supply unit 100 may supply power to the electronic control device 200 described above. The power supply unit 100 may include, for example, a battery BAT, a first inductor L1, a second inductor L2, a regulator 150, and a first resistor R1.

The battery BAT may provide a DC level supply power. To this end, for example, the battery BAT may include a DC power source for providing a DC voltage.

The first inductor L1 may be connected between a first terminal (e.g., a positive terminal) of the battery BAT and a first input terminal T1 of the regulator 150.

The second inductor L2 may be connected between a second terminal (e.g., a negative terminal) of the battery BAT and a second input terminal T2 of the regulator 150.

The first resistor R1 may be connected between the first input terminal T1 of the regulator 150 and the power supply control unit 210. Specifically, the first terminal of the first resistor R1 may be connected to the first input terminal T1 of the regulator 150, and the second terminal of the first resistor R1 may be connected to the supply power control unit 210. The first resistor R1 may prevent inrush current caused by the supply power from the battery BAT. For example, at the moment when the power supply 100 is connected to the electronic control device 200, the inrush current generated by the supply power from the battery BAT may be supplied to the third capacitor C3 through a body diode BD of a turned-off reverse voltage protection switch RT, and in this case, the third capacitor C3 may be damaged due to the inrush current. The first resistor R1 can protect internal elements of the electronic control device 200 by suppressing the generation of such an inrush current.

The regulator 150 may receive supply power from the battery BAT through the first inductor L1 and the second inductor L2, and generate various driving power sources necessary for driving the components (e.g., the microcontroller 220) of the electronic control device 200 by stepping down the supplied supply power. For example, the regulator 150 may generate a driving power of 3.3 V and a driving power of 5 V by stepping down the supply power of 12 V, and the driving power of 3.3 V may be supplied to the microcontroller 220.

The first capacitor C1 may be connected between the negative terminal of the battery BAT and a ground GND. Here, the ground GND may be, for example, a chassis ground GND.

The motor 300 may be a steering assist motor 300 for generating a steering assist force that assists a driver's steering. The motor 300 can be controlled by the electronic control device 200. The motor 300 may be, for example, a three-phase steering auxiliary motor 300 including a U terminal, a V terminal, and a W terminal. In addition, the motor 300 may be a steering auxiliary motor 300 of a single winding type.

The microcontroller 220 may receive various detection signals output as detection results of the sensors from various sensors including a torque sensor and the like, and generate a PWM (Pulse Width Modulation) signal for adjusting the operating force of the steering device according to the received signals. In addition, the microcontroller 220 may convert a torque sensor output value received from the torque sensor into a digital value to generate a torque sensor output voltage, and output a PMW signal by reflecting the rotation direction and force of the motor 300 according to the generated torque sensor output voltage. A motor driving signal (e.g., motor driving current) necessary for vehicle steering may be supplied to the motor 300 by the PWM signal.

Meanwhile, the aforementioned torque sensor may detect steering torque (e.g., steering information such as a steering angle and torque) of a steering device (e.g., a steering wheel) of a vehicle, and output a torque sensor output voltage as a result of the detection. The torque sensor output voltage output from the torque sensor may be transmitted to the electronic control device 200. In this case, a detection range of the torque sensor, for example, a range of the torque sensor output voltage is 0 V to 5 V, and a digital value thereof may be converted into 0 to 1024 digits. If the torque sensor output voltage detected from the sensor is greater than or equal to 0 V and less than 2.5 V (e.g., greater than or equal to 0 digit and less than 512 digits), the electronic control device 200 may determine that the steering device has been rotated counterclockwise (e.g., the vehicle is steered in the left direction). Further, when the detected torque sensor output voltage is 2.5 V (e.g., 512 digits), the electronic control device 200 may determine that the steering device is in a neutral state. In addition, when the detected torque sensor output voltage is greater than 2.5 V and less than 5 V (e.g., greater than 512 digits and less than 1024 digits), the electronic control device 200 may determine that the steering device has been rotated clockwise (e.g., the vehicle is steered in the right direction).

The battery detection unit 240 may sense (or detect) a voltage of the battery BAT. The battery detection unit 240 may include a second resistor R2, a third resistor R3, and a second capacitor C2.

The second resistor R2 may be connected between the first input terminal T1 of the regulator 150 and an input terminal ADT1 of a first analog-to-digital converter.

The third resistor R3 may be connected between the input terminal ADT1 of the first analog-to-digital converter and the ground GND.

The second capacitor C2 may be connected between the input terminal ADT1 of the first analog-to-digital converter and the ground GND.

The battery detection voltage of the analog signal detected by the battery detection unit 240 may be converted into a digital signal by the first analog-to-digital converter and transmitted to the microcontroller 220.

The supply power control unit 210 controls whether or not to supply power supplied from the power supply unit 100 (e.g., power from the battery BAT) to the electronic control device 200. For example, when a power control switch SW of the power supply unit 100 is turned on, power supplied from the power supply unit 100 may be supplied to the electronic control device 200. On the other hand, when the power control switch SW of the power supply unit 100 is turned off, the power supply from the power supply unit 100 to the electronic control device 200 is cut off and the electronic control device 200 does not receive supply power. The supply power control unit 210 may include a battery cut-off switch BT and a reverse voltage protection switch RT as the aforementioned power control switch SW.

The battery cut-off switch BT is controlled according to a control signal from the microcontroller 220, and may be connected between the first input terminal T1 of the regulator 150 and the second terminal of the first resistor R1. In this case, the battery cut-off switch BT may include a body diode connected between a source terminal and a drain terminal thereof.

The reverse voltage protection switch RT is controlled according to a control signal from the microcontroller 220, and may be connected between the second terminal of the first resistor R1 and the first terminal of the third capacitor C3 (e.g., node Na). In this case, the reverse voltage protection switch RT may include a body diode connected between a source terminal and a drain terminal thereof.

Meanwhile, a control terminal of the battery cut-off switch BT and a control terminal of the reverse voltage protection switch RT may be connected to the microcontroller 220 through a fourth resistor R4. The microcontroller 220 may supply a power control signal to the control terminal of the battery cut-off switch BT and the control terminal of the reverse voltage protection switch RT through the fourth resistor R4.

When the battery cut-off switch BT and the reverse voltage protection switch RT are turned on by the power control signal from the microcontroller 220 (e.g., a power control signal in an active state set higher than a threshold voltage of each of the battery cut-off switch BT and the reverse voltage protection switch RT), through the turned-on battery cut-off switch BT and the reverse voltage protection switch RT, power supplied from the battery BAT can be supplied to the third capacitor C3 to be charged.

The third capacitor C3 may be a storage capacitor which stores a supply voltage from the battery BAT. The third capacitor C3 may be connected between the source terminal (or drain terminal; e.g., node Na) of the reverse voltage protection switch RT and the second input terminals T2 of the regulator 150.

The inverter detection unit 250 may sense (or detect) an output of the inverter 260, that is, a voltage of the inverter 260. The inverter detection unit 250 may include a fifth resistor R5, a sixth resistor R6, and a fourth capacitor C4.

The fifth resistor R5 may be connected between the first terminal Na of the third capacitor C3 and an input terminal ADT2 of a second analog-to-digital converter 882.

The sixth resistor R6 may be connected between the input terminal ADT2 of the second analog-to-digital converter 882 and the ground GND.

The fourth capacitor C4 may be connected between the input terminal ADT2 of the second analog-to-digital converter 882 and the ground GND.

The inverter detection voltage of the analog signal detected by the inverter detection unit 250 may be converted into a digital signal by the second analog-to-digital converter and transmitted to the microcontroller 220. Meanwhile, the microcontroller 220 may determine whether or not there is an abnormality in the electronic control device 200 (e.g., whether a reverse electromotive voltage has occurred or not, whether short-circuit has occurred, etc.) based on the battery detection voltage from the above-described first analog-to-digital converter and the inverter detection voltage from the above-described second analog-to-digital converter.

The gate driver 230 may generate PWM signals of different phases based on the PWM signal from the microcontroller 220, for example. As a specific example, when the motor 300 is a three-phase motor 300, PWM signals of different phases may be three-phase PWM signals. In other words, the first gate driver 230 may generate PWM signal for each phase to correspond to the phase of the motor 300.

The inverter 260 may convert supply power provided from the power supply unit 100 (i.e., DC level supply power) into an AC level motor driving signal. Specifically, the inverter 260 controls turn-on and turn-off operations of internal inverter switches according to the PWM signals from the gate driver 230, thereby outputting the motor driving signal corresponding to the PWM signals. As a more specific example, the inverter 260 controls turn-on and turn-off operations of inverter switches IT1, IT2, IT3, IT4, IT5, and IT6 according to the above-described PWM signals (e.g., PWM signals from the gate driver 230), so that supply power supplied from the aforementioned power supply unit 100 can be converted into an AC level motor driving signal.

Meanwhile, the motor driving signal may include, for example, motor driving signals of different phases. For example, motor driving signals of different phases may be three-phase motor driving signals (as a specific example, a first phase (or U phase) motor driving signal, a second phase (or V phase) motor driving signal, and a third phase (or W phase) motor driving signal.

The inverter 260 may output three-phase motor driving signals through an output terminal of the inverter 260, and to this end, for example, the output terminal of the inverter 260 may include a first phase output terminal P1, a second phase output terminal P2, and a third phase output terminal P3. The inverter 260 may include a first inverter switch IT1, a second inverter switch IT2, a third inverter switch IT3, a fourth inverter switch IT4, a fifth inverter switch IT5, and a sixth inverter switch IT6. In this case, the first to third inverter switches IT1 to IT3 may correspond to the high side inverter switches of the inverter 260, and the fourth to sixth inverter switches IT4 to IT6 may correspond to the low side inverter switches of the inverter 260.

The first inverter switch IT1 is controlled according to the PWM signal (e.g., +U phase PWM signal) from the gate driver 230, and may be connected between the first terminal Na of the third capacitor C3 and the first phase output terminal P1 of the inverter 260. In this case, the first inverter switch IT1 may include a body diode BD connected between a source terminal and a drain terminal thereof.

The second inverter switch IT2 is controlled according to the PWM signal (e.g., +V phase pulse PWM signal) from the gate driver 230, and may be connected between the first terminal Na of the third capacitor C3 and the second phase output terminal P2 of the inverter 260. In this case, the second inverter switch IT2 may include a body diode connected between a source terminal and a drain terminal thereof.

The third inverter switch IT3 is controlled according to the PWM signal (e.g. +W phase PWM signal) from the gate driver 230, and may be connected between the first terminal Na of the third capacitor C3 and the third phase output terminal P3 of the inverter 260. In this case, the third inverter switch IT3 may include a body diode connected between a source terminal and a drain terminal thereof.

The fourth inverter switch IT4 is controlled according to the PWM signal (e.g., −U phase PWM signal) from the gate driver 230, and may be connected between the first phase output terminal P1 of the inverter 260 and the second terminal (e.g., node T2a) of the third capacitor C3. In this case, the fourth inverter switch IT4 may include a body diode connected between a source terminal and a drain terminal thereof.

The fifth inverter switch IT5 is controlled according to the PWM signal (e.g., −V phase PWM signal) from the gate driver 230, and may be connected between the second phase output terminal P2 of the inverter 260 and the second terminal (e.g., T2) of the third capacitor C3. In this case, the fifth inverter switch IT5 may include a body diode connected between a source terminal and a drain terminal thereof.

The sixth inverter switch IT6 is controlled according to the PWM signal (e.g., −W phase PWM signal) from the gate driver 230, and may be connected between the third phase output terminal P3 of the inverter 260 and the second terminal (e.g., T2a) of the third capacitor C3. In this case, the sixth inverter switch IT6 may include a body diode connected between a source terminal and a drain terminal thereof.

Meanwhile, the first phase output terminal P1 of the inverter 260 described above may be connected to a first phase terminal NP1 of the motor 300 through a first coil CL1 of the motor 300, the second phase output terminal P2 of the inverter 260 may be connected to a second phase terminal NP2 of the motor 300 through a second coil CL2 of the motor 300, and the third phase output terminal P3 of the inverter 260 may be connected to a third phase terminal NP3 of the motor 300 through a third coil CL3 of the motor 300. In this case, the first coil CL1, the second coil CL2, and the third coil CL3 are wound around a stator of the motor 300 as inductors, respectively.

The first to sixth inverter switches IT1 to IT6 may be turned on in a preset combination by the PWM signals from the gate driver 230 to control a direction of the motor driving signal (e.g., motor drive current) supplied to the motor 300. For example, the first inverter switch IT1 and the sixth inverter switch IT6 may be selectively turned on during a first driving period, the second inverter switch IT2 and the sixth inverter switch IT6 may be selectively turned on during a second driving period, the second inverter switch IT2 and the fourth inverter switch IT4 may be selectively turned on during a third driving period, the third inverter switch IT3 and the fourth inverter switch IT4 may be selectively turned on during a fourth driving period, the third inverter switch IT3 and the fifth inverter switch IT5 may be selectively turned on during a fifth driving period, and the first inverter switch IT1 and the fifth inverter switch IT5 may be selectively turned on during a sixth driving period. In this case, the inverter switches which are not selected in each driving period maintain the turned-off state. For example, during the first driving period, the second to fifth inverter switches IT2 to IT5 maintain the turned-off state.

The output control unit 400 may control whether or not to supply the motor driving signal output from the inverter 260 to the motor 300. To this end, as an example, the output control unit 400 may connect all phase terminals NP1, NP2, and NP3 corresponding to the neutral point of the motor 300 to each other, or may separate all phase terminals NP1, NP2, and NP3 from each other. As a specific example, in response to the output control signal from the microcontroller 220, the output control unit 400 may electrically (and/or physically) connect the first phase terminal NP1, the second phase terminal NP2, and the third phase terminal NP3 of the motor 300 to each other, or may electrically (and/or physically) separate them. The first phase terminal NP1, the second phase terminal NP2, and the third phase terminal NP3 of the motor 300 electrically (and/or physically) connected to each other by the output control unit 400 may achieve the neutral point of the motor 300. When the microcontroller 220 detects the occurrence of an abnormality in the motor 300 or the like, the microcontroller 220 may block the motor driving signal supplied to the motor 300 by controlling the output control unit 400 to electrically (and/or physically) separate all phase terminals of the motor 300 described above (e.g., the first phase terminal NP1, the second phase terminal NP2, and the third phase terminal NP3) from each other. Hereinafter, it is clarified that "electrical connection" may be replaced with "physical connection" or include the "physical connection" unless otherwise specified.

Meanwhile, the output control unit 400 may be a normally-on type switch that operates in a manner of maintaining all phase terminals NP1, NP2, and NP3 of the motor 300 electrically connected in a normal state, and separating the electrical connections between the phase terminals NP1, NP2, and NP3 according to a control signal from the outside (e.g., an output control signal from the microcontroller 220), or a normally-off type switch that operates in a manner of maintaining all phase terminals NP1, NP2, and NP3 of the motor 300 electrically separated in a normal state, and electrically connecting the phase terminals NP1, NP2, and NP3 according to the above operation control signal.

The output control unit 400 may operate in different types based on a start-up time of the vehicle. For example, the output control unit 400 may operate in the normally-off type before the start-up time, and operate in the normally-on type after the start-up time. However, the present disclosure is not limited to the above, and for example, the output control unit 400 may operate in the normally-on type before the start-up time and operate in the normally-off type after the start-up time. In addition, the output control unit 400 may always operate in one type, regardless of before and after the start-up time. The operation type of the output control unit 400 may be changed depending on the concept of the device in which the output control unit 400 is used.

Meanwhile, the electronic control device 200 of the present disclosure may measure the current flowing through the motor 300 (e.g., the motor driving current described above) to precisely control the motor 300. To this end, as an example, the electronic control device 200 may detect the current flowing through the motor 300 using the current sensors CS1 and CS2. For example, when the motor 300 is a motor 300 driven by a three-phase power source, the current sensors CS1 and CS2 may be attached to two output terminals (e.g., the first phase output terminal P1 and the third phase output terminal P2) corresponding to two of the three phases (e.g., U phase and W phase among U phase, V phase, and W phase), and the electronic control device 200 may measure the currents of the two phases (e.g., U phase and W phase) using the current sensors CS1 and CS2, and calculate the current of the remaining one phase (e.g., V phase) using the measured currents of the respective phases.

For example, the first and second current sensors CS1 and CS2 may be connected between the inverter 260 and the motor 300 to sense the magnitude of the current supplied to the motor 300 through the inverter 260 (e.g., the motor driving current described above). The first current sensor CS1 may be connected between the first phase output terminal P1 of the inverter 260 and the first coil CL1 of the motor 300, and the second current sensor CS2 may be connected to the third phase output terminal P3 of the inverter 260 and the second coil CL2 of the motor 300.

Meanwhile, a third current sensor may be further connected between the second phase output terminal P2 of the inverter 260 and the second coil CL2 of the motor 300.

As shown in FIG. 2, the first current sensor CS1 may include a first sense resistor Rs1 and a first amplifier AP1. Meanwhile, the first current sensor CS1 may further include a first analog-to-digital converter 881.

The first sense resistor Rs1 may sense the motor driving current supplied to the motor 300 through the first phase output terminal P1. To this end, as an example, the first sense resistor Rs1 may be connected between the first phase output terminal P1 and the first coil CL1 of the motor 300. In a normal state, the first sense resistor Rs1 may have a small resistance so as not to affect the current flow of the circuit.

The first amplifier AP1 amplifies the voltage sensed by the first sense resistor Rs1. To this end, as an example, a first input terminal of the first amplifier AP1 may be connected to the first phase output terminal P1, and a second input terminal of the first amplifier AP1 may be connected to the first coil CL1. In addition, an output terminal of the first amplifier AP1 may be connected to the first analog-to-digital converter 881.

The first analog-to-digital converter 881 may convert the sensed voltage amplified by the first amplifier AP1 into a digital signal and transmit the converted digital signal to the microcontroller 220.

The second sense resistor Rs2 may sense the motor driving current supplied to the motor 300 through the third phase output terminal P3. To this end, as an example, the second sense resistor Rs2 may be connected between the third phase output terminal P3 and the third coil CL3 of the motor 300. In a normal state, the second sense resistor Rs2 may have a small resistance so as not to affect the current flow of the circuit.

The second amplifier AP2 amplifies the voltage sensed by the second sense resistor Rs2. To this end, as an example, a first input terminal of the second amplifier AP2 may be connected to the third phase output terminal P3, and the second input terminal of the second amplifier AP2 may be connected to the third coil CL3. In addition, an output terminal of the second amplifier AP2 may be connected to the second analog-to-digital converter 882. Meanwhile, the second current sensor CS2 may further include the second analog-digital converter 882.

The second analog-to-digital converter 882 may convert the sensed voltage amplified by the second amplifier AP2 into a digital signal and transmit the converted digital signal to the microcontroller 220.

The electronic control device 200 may calculate a torque generated in the motor 300 and a ripple according to the torque, that is, a torque ripple, using the current of each phase measured as described above. The torque ripple may be caused by an error in a path that transmits the current detected by the current sensor, an error in the voltage applied to the current sensor, or an offset (e.g., DC offset) of the current sensor itself, and the motor 300 may not be accurately controlled due to the torque ripple.

Here, the offset is a small amount of DC current for operating the current sensor. When the current sensor measures the current flowing through the motor 300, a small amount of current required to operate the current sensor flows, and the current output from the current sensor is the sum of the current flowing through the motor 300 to be actually obtained and the small amount of current required to operate the current sensor. In this case, the value of the current actually flowing through the motor 300 to be measured is distorted due to the small amount of current. Since the offset voltage is absolutely necessary to measure the current flowing through the motor 300 and cannot be completely removed, the offset needs to be considered when measuring the current flowing through the motor 300.

In order to accurately detect the offset of the current sensor, the electronic control device 200 of the present disclosure may control the operation of the inverter, so that during the detection period of the offset (e.g., offset voltage of the current sensor), the current sensor remains connected to either the power supply unit 100 or the ground GND. For example, the microcontroller 220 may connect the first current sensor CS1 and the second current sensor CS2 to one of the power supply unit 100 and the ground GND to detect the respective offset voltages of the first and second current sensors CS1 and CS2. This will be described in detail with reference to FIGS. 3 to 6.

Figure 3:
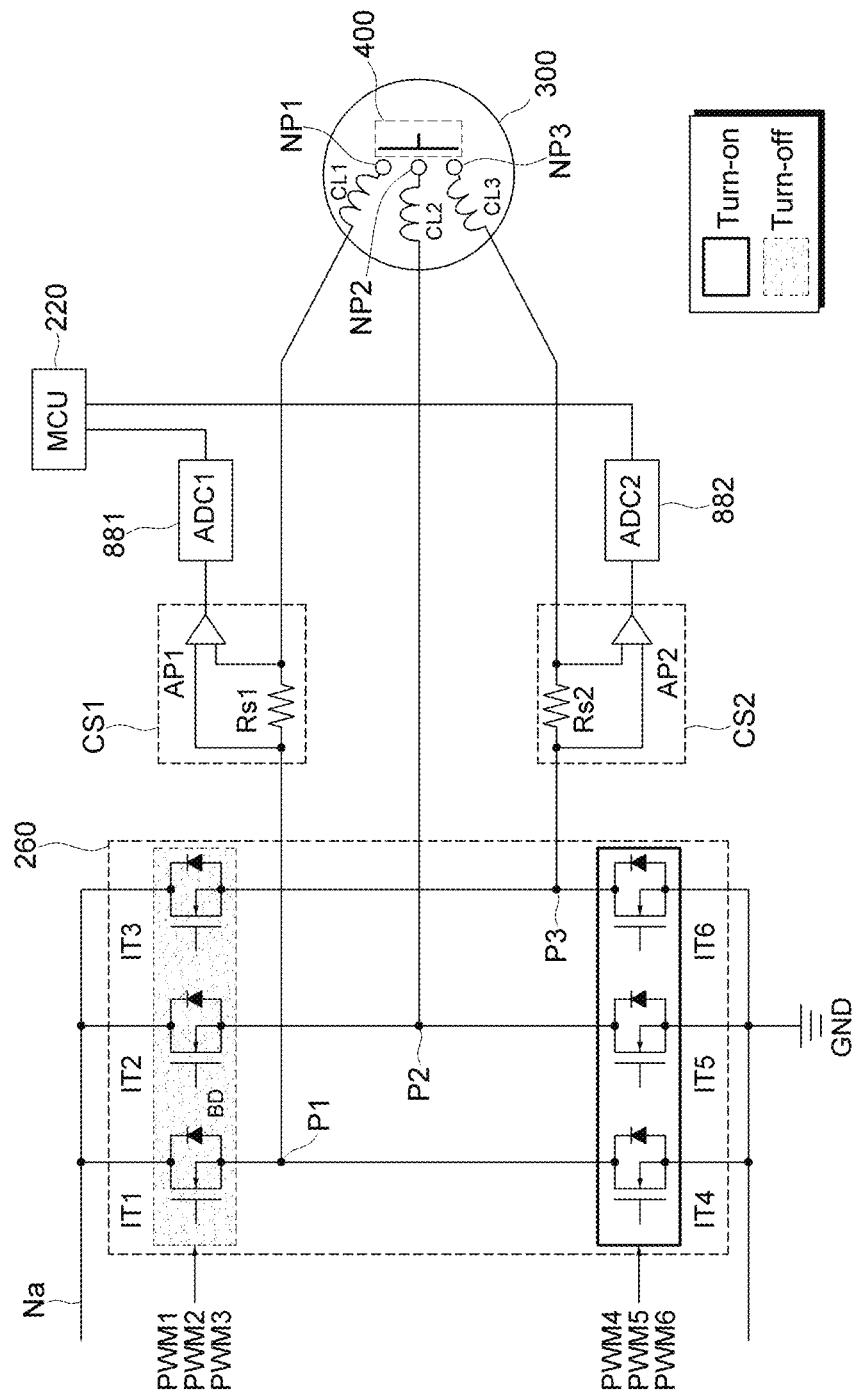
FIG. 3 is a diagram for explaining an operation of an inverter for detecting an offset voltage of the current sensor.
Figure 4:
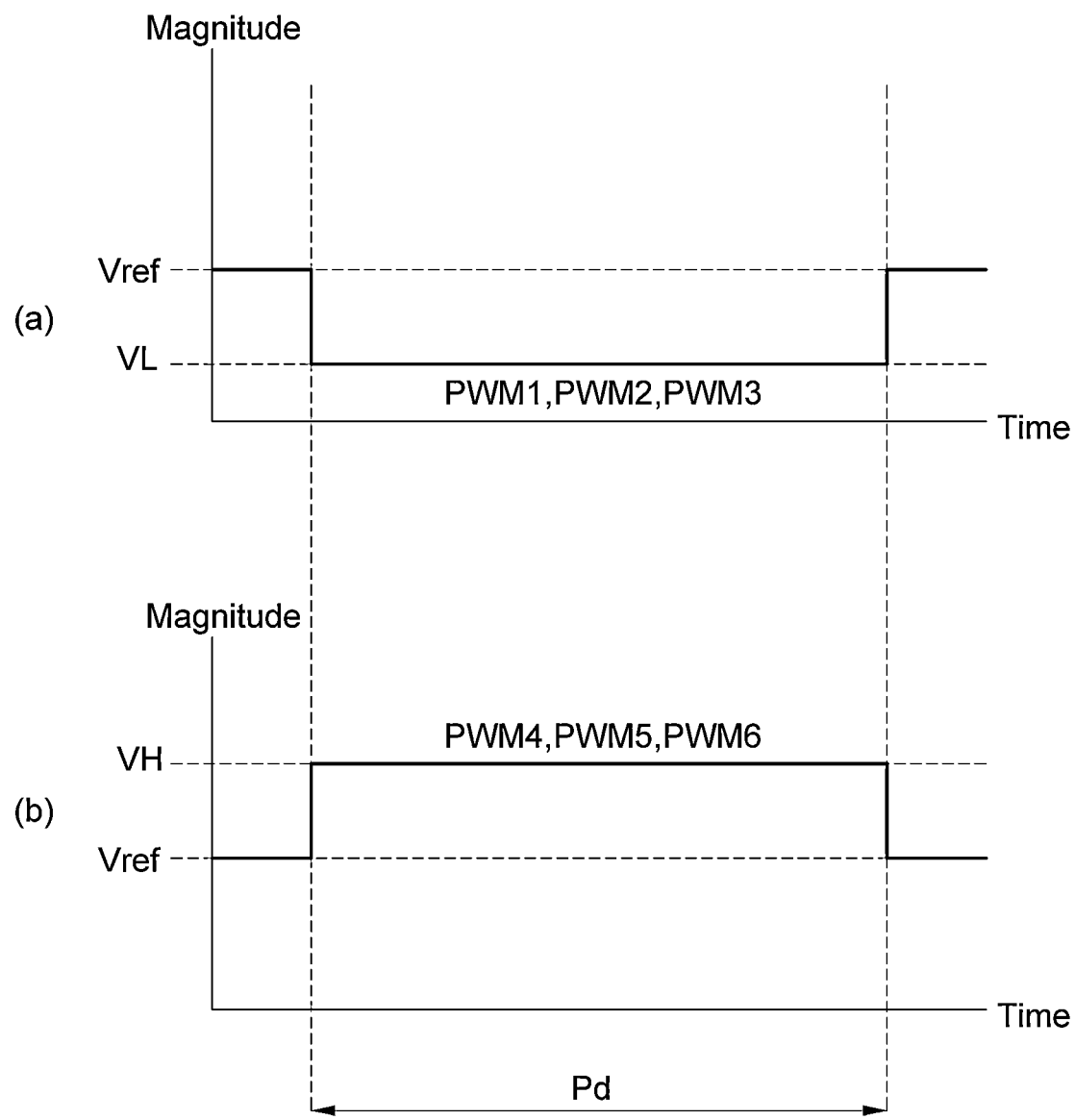
FIG. 4 is a diagram illustrating a pulse width modulation (PWM) signal supplied to the inverter of FIG. 3.

FIG. 3 is a diagram for explaining an operation of the inverter for detecting an offset voltage of the current sensor, and FIG. 4 is a diagram illustrating a PWM signal supplied to the inverter of FIG. 3. Meanwhile, in FIG. 3, a switch surrounded by a relatively thick line box means that the switch is in a turn-on state, whereas a switch surrounded by a gray dotted line box means that the switch is in a turn-off state.

As shown in FIG. 3, the microcontroller 220 may connect the first current sensor CS1 and the second current sensor CS2 to the ground GND to detect the respective offset voltages of the first and second current sensors CS1 and CS2. To this end, as an example, the microcontroller 220 may turn off the high side inverter switch (e.g., the first to third inverter switches IT1, IT2, and IT3 connected to the power supply unit 100) of the inverter 260, while turning on the low side inverter switches (e.g., the fourth to sixth inverter switches IT4, IT5, and IT6 connected to the ground GND) of the inverter 260. In this case, the first current sensor CS1 can be connected to the ground GND through the turned-on fourth inverter switch IT4, and the second current sensor CS2 can be connected to the ground GND through the turned-on sixth inverter switch IT6.

In order for the first to sixth inverter switches IT1 to IT6 to operate as shown in FIG. 3, the first to sixth inverter switches IT1 to IT6 may receive the switch control signals as shown in FIG. 4 (e.g., PWM signals). For example, during the detection period Pd of detecting the offset voltages of the first current sensor CS1 and the second current sensor CS2, the microcontroller 220 may supply a first PWM signal PWM1 to a gate electrode of the first inverter switch IT1, supply a second PWM signal PWM2 to a gate electrode of the second inverter switch IT2, supply a third PWM signal PWM3 to a gate electrode of the third inverter switch IT3, supply a fourth PWM signal PWM4 to a gate electrode of the fourth inverter switch IT4, supply a fifth PWM signal PWM5 to a gate electrode of the fifth inverter switch IT5, and supply a sixth PWM signal PWM6 to a gate electrode of the sixth inverter switch IT6. In this case, the first to third PWM signals PWM1, PWM2, and PWM3 may be maintained at a turn-off level VL during the detection period Pd as shown in (a) of FIG. 4, and the fourth to sixth PWM signals PWM4, PWM5, and PWM6 may be maintained at a turn-on level VH during the detection period Pd as shown in (b) of FIG. 4. For example, the first to third PWM signals PWM1, PWM2, and PWM3 may each have a fixed value of the turn-off level VL lower than a reference voltage Vref during the detection period Pd, and, the fourth to sixth PWM signals PWM4, PWM5, and PWM6 may each have a fixed value of the turn-on level VH higher than the reference voltage Vref during the detection period Pd. Here, the turn-off level VL may mean, for example, a value smaller than a threshold voltage of the inverter switches IT1 to IT6, and the turn-on level VH may mean, for example, a value greater than the threshold voltage of the inverter switches IT1 to IT6.

The microcontroller 220 may detect the offset voltages of the first current sensor CS1 and the second current sensor CS2 using the first current sensor CS1 and the second current sensor CS2 within the detection period Pd. In this case, during the detection period Pd, the inverter switches of either of the high-side inverter switches IT1, IT2, and IT3 or the low-side inverter switches IT4, IT5, and IT6 (e.g., the first to third inverter switches IT1 to IT3) are all turned off, and no motor driving current is substantially generated during the detection period Pd. Therefore, interference by the motor driving current does not occur during the detection period Pd. Also, during the detection period Pd, the first current sensor CS1 and the second current sensor CS2 are connected to the ground GND without being floated. Accordingly, the voltages of the terminals of the first current sensor CS1 and the second current sensor CS2 can be accurately defined. Further, during the detection period Pd, the PWM signals PWM1 to PWM6 supplied to the first to sixth inverter switches IT1 to IT6 are fixed at a constant level (e.g., the turn-on level VH or the turn-off level VL). Therefore, no switching noise is generated. As described above, interference by the motor driving current does not occur, the terminal voltages of the first current sensor CS1 and the second current sensor CS2 are accurately defined, and no switching noise is generated, so that during the detection period Pd, the offset voltage of the first current sensor CS1 and the offset voltage of the second current sensor CS2 can be accurately detected. In other words, during the detection period Pd, the microcontroller 220 can accurately detect the offset voltages of the first current sensor CS1 and the second current sensor CS2 using the first current sensor CS1 and the second current sensor CS2. Consequently, this may mean that the current sensed from the first current sensor CS1 and the current sensed from the second current sensor CS2 during the detection period Pd accurately reflect the offset voltage of the first current sensor CS1 and the offset voltage of the second current sensor CS2, respectively.

Meanwhile, the aforementioned detection period Pd may mean, for example, a period in which all the phase terminals (e.g., the first phase terminal NP1, the second phase terminal NP2, and the third phase terminal NP3) of the motor 300 described above are electrically (and/or physically) separated from each other. In other words, the aforementioned detection period Pd may mean a period in which the output control unit 400 and the first phase terminal NP1, second phase terminal NP2, and third phase terminal NP3 are separated from each other.

Further, the detection period Pd may include a period in which the electronic control device 200 does not perform the control of the current of the motor 300. For example, the detection period may include an ignition start initial check period, a fail-safety period, and a power latch period.

Figure 5:
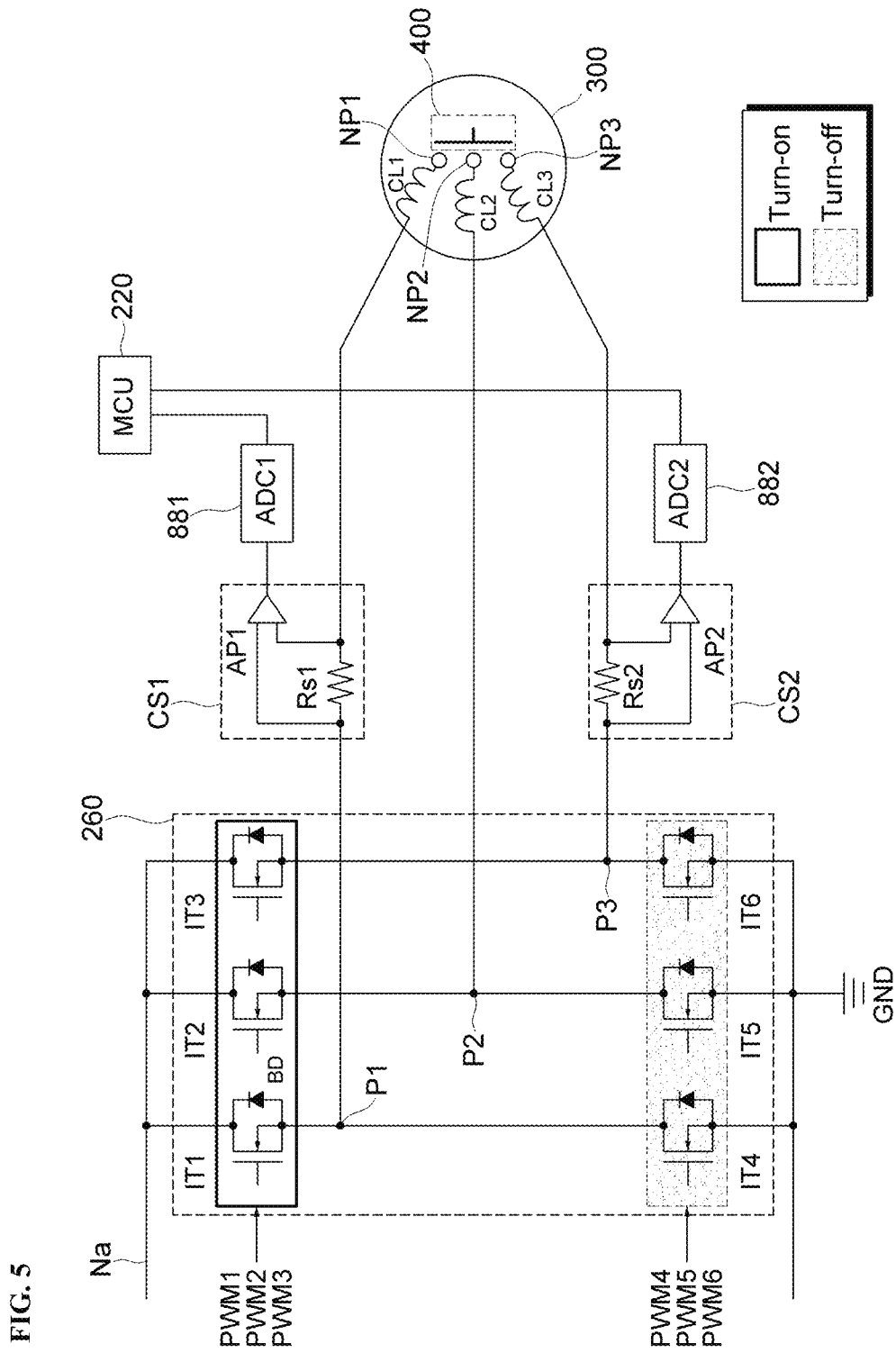
FIG. 5 is a diagram for explaining another operation of the inverter for detecting the offset voltage of the current sensor.
Figure 6:
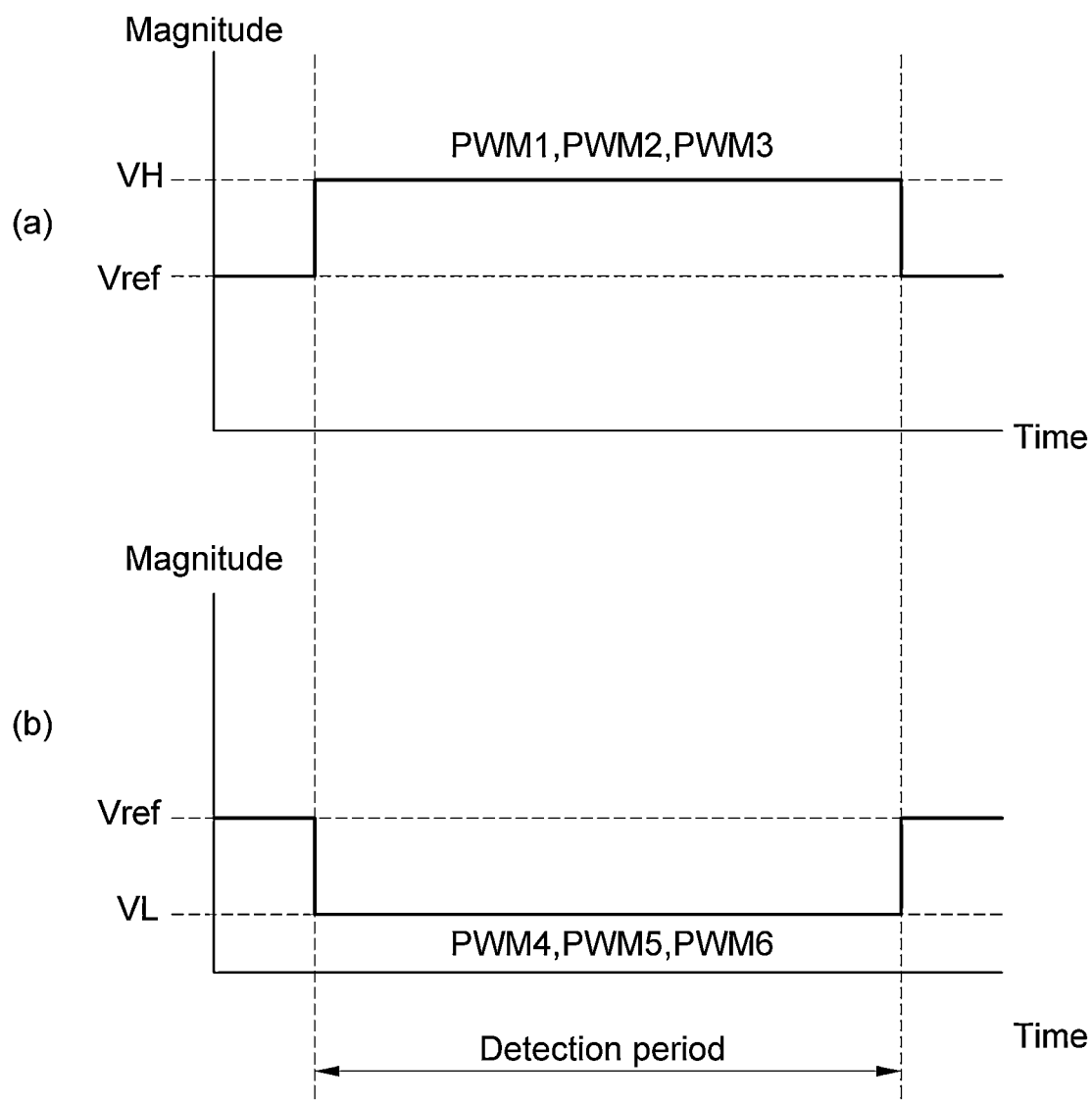
FIG. 6 is a diagram illustrating a PWM signal supplied to the inverter of FIG. 5.

FIG. 5 is a diagram for explaining another operation of the inverter for detecting an offset voltage of the current sensor, and FIG. 6 is a diagram showing a PWM signal supplied to the inverter of FIG. 5. Meanwhile, in FIG. 5, a switch surrounded by a relatively thick line box means that the switch is in a turn-on state, whereas a switch surrounded by a gray dotted line box means that the switch is in a turn-off state.

As shown in FIG. 5, the microcontroller 220 may connect the first and second current sensors CS1 and CS2 to the ground GND to detect the respective offset voltages of the first and second current sensors CS1 and CS2. To this end, as an example, the microcontroller 220 may turn on the high side inverter switch of the inverter 260 (e.g., the first to third inverter switches IT1, IT2, and IT3 connected to the power supply unit 100) and switches of the supply power control unit 210 (e.g., the battery cut-off switch BT and the reverse voltage protection switch RT), while turning off the low side inverter switch of the inverter 260 (e.g., the fourth to sixth inverter switches IT4, IT5, and IT6 connected to the ground GND). In this case, the first current sensor CS1 can be connected to the first input terminal T1 of the power supply unit 100 through the turned-on first inverter switch IT1 and the switches of the supply power control unit 210, and the second current sensor CS2 can be connected to the first input terminal T1 of the power supply unit 100 through the turned-on third inverter switch IT3 and the switches of the supply power control unit 210.

In order for the first to sixth inverter switches IT1 to IT6 to operate as shown in FIG. 5, the first to sixth inverter switches IT1 to IT6 may receive the switch control signals as shown in FIG. 6 (e.g., PWM signals). For example, during the detection period Pd of detecting the offset voltages of the first current sensor CS1 and the second current sensor CS2, the microcontroller 220 may supply a first PWM signal PWM1 to the gate electrode of the first inverter switch IT1, supply a second PWM signal PWM2 to the gate electrode of the second inverter switch IT2, supply a third PWM signal PWM3 to the gate electrode of the third inverter switch IT3, supply a fourth PWM signal PWM4 to the gate electrode of the fourth inverter switch IT4, supply a fifth PWM signal PWM5 to the gate electrode of the fifth inverter switch IT5, and supply a sixth PWM signal PWM6 to the gate electrode of the sixth inverter switch IT6. In this case, the first to third PWM signals PWM1, PWM2, and PWM3 may be maintained at the turn-on level VH during the detection period Pd as shown in (a) of FIG. 6, and the fourth to sixth PWM signals PWM4, PWM5, and PWM6 may be maintained at the turn-off level VL during the detection period Pd as shown in (b) of FIG. 6. For example, the first to third PWM signals PWM1, PWM2, and PWM3 may each have a fixed value of the turn-on level VH higher than the reference voltage Vref during the detection period Pd, and, the fourth to sixth PWM signals PWM4, PWM5, and PWM6 may each have a fixed value of the turn-off level VL lower than the reference voltage Vref during the detection period Pd. Here, the turn-off level VL may mean, for example, a value smaller than the threshold voltage of the inverter switches IT1 to IT6, and the turn-on level VH may mean, for example, a value greater than the threshold voltage of the inverter switches IT1 to IT6.

The microcontroller 220 may detect the offset voltages of the first current sensor CS1 and the second current sensor CS2 using the first current sensor CS1 and the second current sensor CS2 within the detection period Pd. In this case, during the detection period Pd, the inverter switches of either of the high-side inverter switches IT1, IT2, and IT3 or the low-side inverter switches IT4, IT5, and IT6 (e.g., the fourth to sixth inverter switches IT4 to IT6) are all turned off, and no motor driving current is substantially generated during the detection period Pd. Therefore, interference by the motor driving current does not occur during the detection period Pd. Also, during the detection period Pd, the first current sensor CS1 and the second current sensor CS2 are connected to a terminal of the power supply unit 100 (e.g., the terminal T1 to which the positive polarity voltage of the battery BAT is applied) without being floated. Accordingly, the voltages of the terminals of the first current sensor CS1 and the second current sensor CS2 can be accurately defined. Further, during the detection period Pd, the PWM signals PWM1 to PWM6 supplied to the first to sixth inverter switches IT1 to IT6 are fixed at a constant level (e.g., the turn-on level VH or the turn-off level VL). Therefore, no switching noise is generated. As described above, interference by the motor driving current does not occur, the terminal voltages of the first current sensor CS1 and the second current sensor CS2 are accurately defined, and no switching noise is generated, so that during the detection period Pd, the offset voltage of the first current sensor CS1 and the offset voltage of the second current sensor CS2 can be accurately detected. In other words, during the detection period Pd, the microcontroller 220 can accurately detect the offset voltages of the first current sensor CS1 and the second current sensor CS2 using the first current sensor CS1 and the second current sensor CS2. Consequently, this may mean that the current sensed from the first current sensor CS1 and the current sensed from the second current sensor CS2 during the detection period Pd accurately reflect the offset voltage of the first current sensor CS1 and the offset voltage of the second current sensor CS2, respectively.

Meanwhile, the aforementioned detection period Pd may mean, for example, a period in which all the phase terminals (e.g., the first phase terminal NP1, the second phase terminal NP2, and the third phase terminal NP3) of the motor 300 described above are electrically (and/or physically) separated from each other. In other words, the aforementioned detection period Pd may mean a period in which the output control unit 400 and the first phase terminal NP1, second phase terminal NP2, and third phase terminal NP3 are separated from each other.

Further, the detection period Pd may include a period in which the electronic control device 200 does not perform the control of the current of the motor 300. For example, the detection period may include an ignition start initial check period, a fail-safety period, and a power latch period.

Meanwhile, the offset voltages of the first and second current sensors CS1 and CS2 detected during the detection period Pd as described above may be stored in a storage unit such as a memory.

The microcontroller 220 can control the operation of the inverter 260 based on the offset voltage of the first current sensor CS1 and the offset voltage of the second current sensor CS2 stored in the storage unit. For example, when the motor 300 is normally driven, can more accurately control the motor driving current supplied to the motor 300 by controlling the operation of the inverter 260 based on the offset voltages stored in the storage unit.

Figure 7:
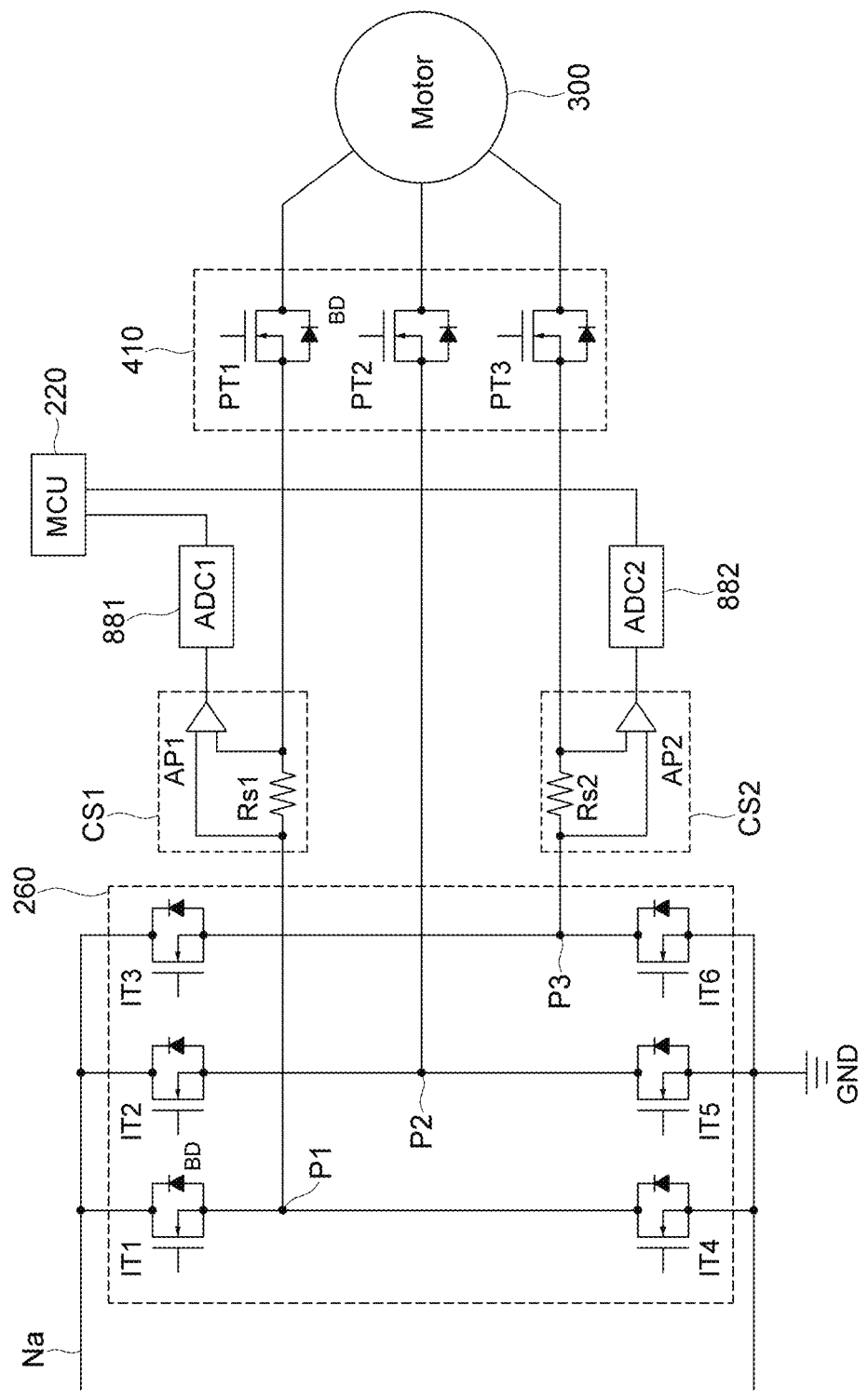
FIG. 7 is a circuit configuration diagram of an electronic control device according to another embodiment of the present disclosure.

FIG. 7 is a circuit configuration diagram of an electronic control device 200 according to another embodiment of the present disclosure.

The electronic control device 200 according to another embodiment of the present disclosure, as shown in FIG. 7, may further include an inverter output control unit 410 disposed outside the motor 300.

The inverter output control unit 410 may control whether or not to supply the motor driving signal output from the inverter 260 to the motor 300. For example, the inverter output control unit 410 may maintain all output terminals P1, P2, and P3 of the inverter 260 and all phase terminals NP1, NP2, and NP3 of the motor 300 electrically connected in the normal state described above, and during the detection period (Pd) described above, may electrically separate all output terminals P1, P2, and P3 of the inverter 260 and all phase terminals NP1, NP2, and NP3 of the motor 300. As a specific example, when first to third output control switches PT1, PT2, and PT3 of the inverter output control unit 410 are turned on, a motor driving signal from the inverter 260 can be supplied to the motor 300. On the other hand, when the first to third output control switches PT1, PT2, and PT3 of the inverter output control unit 410 are turned off, the motor driving signal from the inverter 260 to the motor 300 is cut off and the motor 300 does not receive a motor driving signal from the inverter 260. The inverter output control unit 270 may include a first output control switch PT1, a second output control switch PT2, and a third output control switch PT3.

The first output control switch PT1 is controlled according to an output control signal from the microcontroller 220, and may be connected between the first phase output terminal P1 and the first phase terminal of the motor 300. In this case, the first output control switch PT1 may include a body diode BD connected between a source terminal and a drain terminal thereof.

The second output control switch PT2 is controlled according to an output control signal from the microcontroller 220, and may be connected between the second phase output terminal P2 and the second phase terminal of the motor 300. In this case, the second output control switch PT2 may include a body diode connected between a source terminal and a drain terminal thereof.

The third output control switch PT3 is controlled according to an output control signal from the microcontroller 220, and may be connected between the third phase output terminal P3 and the third phase terminal of the motor 300. In this case, the third output control switch PT3 may include a body diode connected between a source terminal and a drain terminal thereof.

Meanwhile, the motor 300 of FIG. 7 may include the first coil CL1, the second coil CL2, the third coil CL3, and the output control unit 400 of FIG. 1 (or FIG. 2). Unlike this, the motor 300 of FIG. 7 may not include the output control unit 400. In other words, the inverter output control unit 410 of FIG. 7 may replace the output control unit 400 described above. However, in this case, the first phase terminal NP1, the second phase terminal NP2, and the third phase terminal NP3 of the motor 300 may remain connected. In other words, the first coil CL1, the second coil CL2, and the third coil CL3 may be connected at a neutral point.

As in the example shown in FIG. 7, the aforementioned inverter output control unit 410 may be disposed between the current sensors CS1 and CS2 and the motor 300. As a specific example, the first output control switch PT1 of the inverter output control unit 410 may be connected between the first sense resistor Rs1 of the first current sensor CS1 and the first coil CL1 of the motor 300, the second output control switch PT2 may be connected between the second phase output terminal P2 of the inverter 260 and the second coil CL2 of the motor 300, and the third output control switch PT3 may be connected between the second sense resistor Rs2 of the second current sensor CS2 and the third coil CL3 of the motor 300.

Meanwhile, the offset voltage of the first current sensor CS1 and the offset voltage of the second current sensor CS2 detected during the detection period Pd as described above may be stored in a storage unit such as a memory.

The microcontroller 220 may control the operation of the inverter 260 based on the offset voltage of the first current sensor CS1 and the offset voltage of the second current sensor CS2 stored in the storage unit. For example, when the motor 300 is normally driven, the microcontroller 220 can more accurately control the motor driving current supplied to the motor 300 by controlling the operation of the inverter 260 based on the offset voltages stored in the storage unit.

Figure 8:
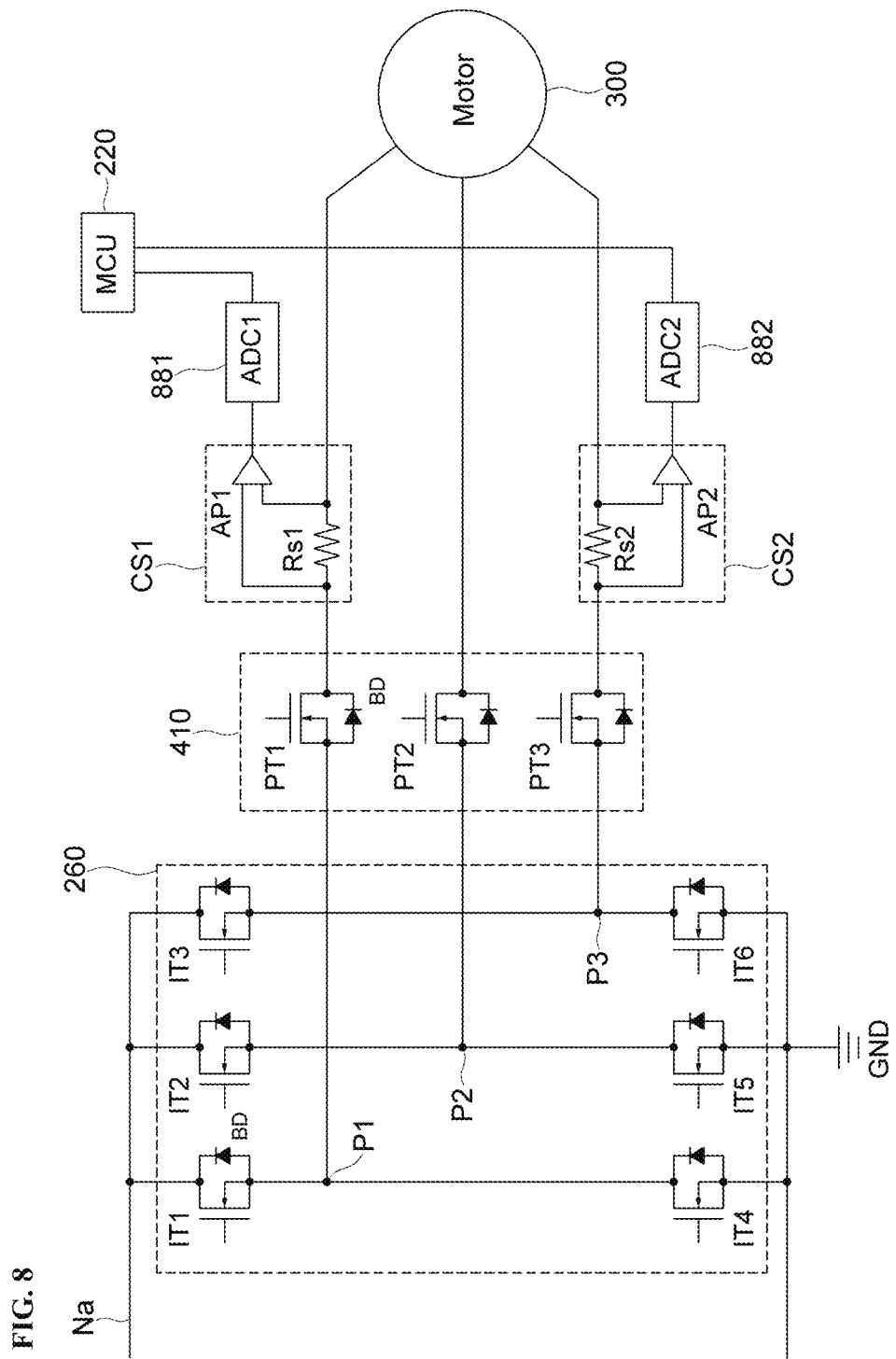
FIG. 8 is a circuit configuration diagram of an electronic control device according to still another embodiment of the present disclosure.

FIG. 8 is a circuit configuration diagram of an electronic control device 200 according to still another embodiment of the present disclosure.

The electronic control device 200 according to still another embodiment of the present disclosure, as shown in FIG. 8, may further include an inverter output control unit 410 disposed outside the motor 300. The inverter output control unit 410 of FIG. 8 is the same as the inverter output control unit 410 of FIG. 7 described above. However, unlike the inverter output control unit 410 of FIG. 7, the inverter output control unit 410 of FIG. 8 may be disposed between the inverter 260 and the current sensors CS1 and CS2.

As a specific example, the first output control switch PT1 of the inverter output control unit 410 may be connected between the first phase output terminal P1 of the inverter 260 and the first sense resistor Rs1 of the first current sensor CS1, the second output control switch PT2 may be connected between the second phase output terminal P2 of the inverter 260 and the second coil CL2 of the motor 300, and the third The output control switch PT3 may be connected between the third phase output terminal P3 of the inverter 260 and the second sense resistor Rs2 of the second current sensor CS2.

Figure 9:
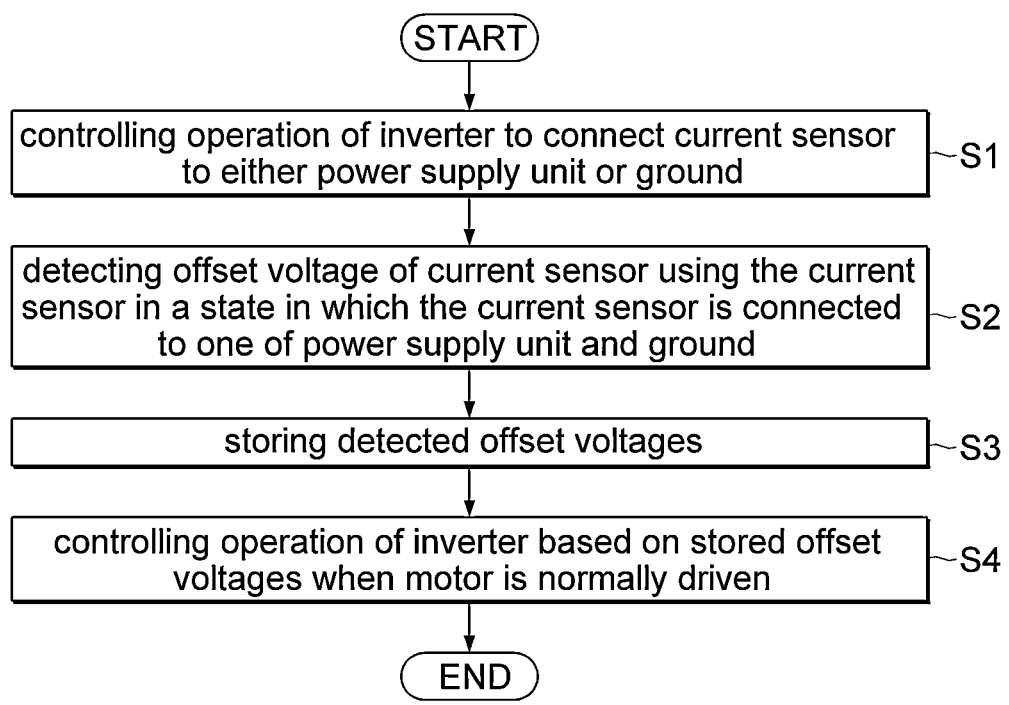
FIG. 9 is a flowchart illustrating a method of driving an electronic control device according to one embodiment of the present disclosure.

FIG. 9 is a flowchart illustrating a method of driving the electronic control device 200 according to one embodiment of the present disclosure.

First, during the detection period Pd, a step S1 of controlling the operation of the inverter 260 to connect the current sensor to either the power supply 300 or the ground GND may be performed. For example, as described above, the first current sensor CS1 may be connected to the ground GND through the turned-on fourth inverter switch IT4, the second current sensor CS2 may be connected to the ground GND through the turned-on sixth inverter switch IT6. To this end, as an example, the high-side inverter switch (e.g., the first to third inverter switches IT1, IT2, IT3 connected to the power supply unit 100) of the inverter 260 may be turned off, while the low side inverter switches (e.g., the fourth to sixth inverter switches IT4, IT5, and IT6 connected to the ground GND) of the inverter 260 may be turned on. In this case, during the detection period Pd, the first to third PWM signals PWM1, PWM2, and PWM3 respectively supplied to the first to third inverter switches IT1, IT2, and IT3 may each have a fixed value of the turn-off level VL lower than the reference voltage Vref, and during the detection period Pd, the fourth to sixth PWM signals PWM4, PWM5, and PWM6 respectively supplied to the fourth to sixth inverter switches IT4, IT5, and IT6 may each have a fixed value of the turn-on value VH higher than the reference voltage Vref.

Then, a step S2 of detecting an offset voltage of the current sensor using the current sensor in a state in which the current sensor is connected to one of the power supply 300 and the ground GND may be performed. For example, within the detection period Pd in which the first current sensor CS1 and the second current sensor CS2 are maintained connected to the ground GND as described above, the offset voltage of the first current sensor CS1 and the offset voltage of the second current sensor CS2 may be respectively detected through the first current sensor CS1 and the second current sensor CS2.

Then, a step S3 of storing the detected offset voltages may be performed. For example, the offset voltage of the first current sensor CS1 and the offset voltage of the second current sensor CS2 detected during the detection period Pd may be stored in a storage unit such as a memory.

Next, when the motor 300 is normally driven, a step S4 of controlling the operation of the inverter 260 based on the stored offset voltages may be performed. For example, the operation of the inverter 260 may be controlled based on the offset voltage of the first current sensor CS1 and the offset voltage of the second current sensor CS2 stored in the storage unit. In other words, when the motor 300 is normally driven, the operation of the inverter 260 can be controlled based on the offset voltages stored in the storage unit, and thus the motor driving current supplied to the motor 300 can be more accurately controlled.

Meanwhile, it will be understood that each block of the process flow chart diagrams and combinations of the flow chart diagrams may be performed by computer program instructions. Since these computer program instructions may be loaded into a processor of a general-purpose computer, special-purpose computer, or other programmable data processing equipment, those instructions executed by the processor of the computer or other programmable data processing equipment will create means for performing the functions described in the flowchart block(s). Since these computer program instructions are also capable of being stored in a computer usable or computer readable memory that can be directed to the computer or other programmable data processing equipment to implement functionality in a specific way, the instructions stored in the computer usable or computer readable memory are also capable of producing an article of manufacture containing instruction means that performs the functions described in the flowchart block(s). The computer program instructions may also be loaded on a computer or other programmable data processing equipment, and instructions which create a computer-executed process by performing a series of operational steps on the computer or other programmable data processing equipment may provide steps for executing the functions described in the flowchart block(s).

In addition, each block may represent a portion of a module, segment or code that includes one or more executable instructions for executing specified logical function(s). It should also be noted that in some alternative implementations, it is possible for the functions mentioned in the blocks to occur regardless of order. For example, two blocks shown in succession may in fact be executed substantially concurrently, or the blocks may sometimes be executed in reverse order depending on their functions. In this case, the term '. . . unit' used in the present embodiments means software or a hardware component such as FPGA or ASIC, and '. . . unit' performs certain roles. However, '. . . unit' is not limited to software or hardware. '. . . unit' may be configured to be in an addressable storage medium and may be configured to reproduce one or more processors. Accordingly, as an example, '. . . unit' refers to components such as software components, object-oriented software components, class components, and task components, processes, functions, properties, and procedures, subroutines, segments of program code, drivers, firmware, microcode, circuits, data, databases, data structures, tables, arrays, and variables. Components and functions provided within '. . . units' may be combined into a smaller number of components and '. . . units' or may be further separated to additional components and 'units'. In addition, components and '. . . units' may be implemented to play one or more CPUs in a device or a secure multimedia card.

Those of ordinary skill in the art to which the present disclosure belongs will be able to understand that the present disclosure may be implemented in other specific forms without changing its technical spirit or essential features. Therefore, the embodiments described above should be understood as illustrative in all respects and not limiting. It should be interpreted that the scope of the present disclosure is defined by the claims to be described later rather than the above detailed description, and all changes or modifications derived from the meaning and scope of the claims and equivalent concepts thereof are included in the scope of the present disclosure.

Meanwhile, although the present specification and drawings disclose preferred embodiments of the present disclosure and specific terms are used, they are only used in a general sense to easily explain the technical content of the present disclosure and help understanding of the present disclosure without limiting the scope of the present disclosure. In addition to the embodiments disclosed herein, it is obvious to those skilled in the art that other modified examples based on the technical spirit of the present disclosure may be implemented.

DESCRIPTION OF REFERENCE NUMERALS

220: microcontroller or controller
260: inverter
300: motor
400: output control unit or controller
IT1: first inverter switch
IT2: second inverter switch
IT3: third inverter switch
IT4: fourth inverter switch
IT5: fifth inverter switch
IT6: sixth inverter switch
PWM1: first PWM signal
PWM2: second PWM signal
PWM3: third PWM signal
PWM4: fourth PWM signal
PWM5: fifth PWM signal
PWM6: sixth PWM signal
NP1: first phase terminal
NP2: second phase terminal
NP3: third phase terminal
P1: first phase output terminal
P2: second phase output terminal
P3: third phase output terminal
P4: fourth phase output terminal
P5: fifth phase output terminal
P6: sixth phase output terminal
Na: node
GND: ground
CS1: first current sensor
CS2: second current sensor
Rs1: first sense resistor Rs2: second sense resistor
CS2: second current sensor
AP1: first amplifier
AP2: second amplifier
CL1: first coil
CL2: second coil
CL3: third coil
BD: body diode
881 first analog-to-digital converter
882 second analog-to-digital converter

What is claimed is:

1. An electronic control device comprising:
an inverter connected between a power supply and a motor;
a current sensor connected between the inverter and the motor; and
a controller configured to detect an offset voltage of the current sensor,
wherein the inverter includes:
a plurality of first switches connected between an output terminal of the inverter and the power supply; and
a plurality of second switches connected between the output terminal of the inverter and a ground, and
the controller is configured to, during detection of the offset voltage of the current sensor, turn off all of the plurality of first switches or all of the plurality of second switches such that the current sensor is connected to one of the power supply and the ground and the offset voltage is detected based on a current detected using the current sensor, and
wherein the offset voltage of the current sensor is an amount of a DC voltage for operating the current sensor.

2. The electronic control device of claim 1, wherein the controller is configured to, during the detection of the offset voltage of the current sensor, supply a first switch control signal to the first switches to control the first switches, and supply the second switches with a second switch control signal having a different level from the first switch control signal to control the second switches.

3. The electronic control device of claim 2, wherein:
the first switch control signal is fixed to one of a turn-on level and a turn-off level during the detection of the offset voltage of the current sensor by the controller, and
the second switch control signal is fixed to a remaining other one of the turn-on level and the turn-off level during the detection of the offset voltage of the current sensor by the controller.

4. The electronic control device of claim 1, wherein the current sensor includes:
a resistor connected between an output terminal of the inverter and the motor; and
an amplifier coupled to the resistor.

5. The electronic control device of claim 1, wherein the controller is configured to detect the offset voltage using the current sensor in a state in which the current sensor is connected to one of the power supply and the ground.

6. The electronic control device of claim 5, wherein the controller is configured to store the detected offset voltage of the current sensor.

7. The electronic control device of claim 6, wherein the controller is configured to control the inverter based on the stored offset voltage of the current sensor.

8. The electronic control device of claim 1, wherein the controller is configured to control the inverter based on the offset voltage of the current sensor.

9. A method comprising:
by an electronic control device including a current sensor connected between an inverter and a motor, turning off all of a plurality of first switches of the inverter connected between an output terminal of the inverter and a power supply, or turning off all of a plurality of second switches of the inverter connected between the output terminal of the inverter and a ground such that the current sensor is connected to one of the power supply and the ground; and
detecting an offset voltage of the current sensor in a state in which the current sensor is connected to one of the power supply and the ground,
wherein the offset voltage of the current sensor is detected based on a current detected using the current sensor, and
wherein the offset voltage of the current sensor is an amount of a DC voltage for operating the current sensor.

10. The method of claim 9, wherein, during detection of the offset voltage of the current sensor, a first switch control signal is supplied to the first switches to control the first switches, and a second switch control signal having a different level from the first switch control signal is supplied to the second switches to control the second switches.

11. The method of claim 10, wherein:
during the detection of the offset voltage of the current sensor, the first switch control signal is fixed to one of a turn-on level and a turn-off level, and
during the detection of the offset voltage of the current sensor, the second switch control signal is fixed to a remaining other one of the turn-on level and the turn-off level.

12. The method of claim 9, further comprising storing the detected offset voltage of the current sensor.

13. The method of claim 12, further comprising controlling the inverter of the current sensor based on the stored offset voltage.

14. The driving method of claim 9, further comprising driving the motor by controlling the inverter based on the offset voltage of the current sensor.

15. The driving method of claim 9, wherein the current sensor includes:
a resistor connected between an output terminal of the inverter and the motor; and
an amplifier coupled to the resistor.

16. The electronic control device of claim 1, wherein the controller is further configured to supply a first switch control signal to the first switches and a second switch control signal to the second switches,
the first switch control signal and the second switch control signal are maintained at a constant level, either a turn-on level or a turn-off level, during the detection of the offset voltage of the current sensor, and
during the detection of the offset voltage of the current sensor, either all of the first switches remain turned off while all of the second switches remain turned on, or all of the second switches remain turned off while all of the first switches remain turned on.

* * * * *